United States Patent [19]
Ingram

[11] 3,931,607
[45] Jan. 6, 1976

[54] ARRAY TRANSDUCER ANGULAR TRACKING SYSTEM

[75] Inventor: Richard D. Ingram, Boalsburg, Pa.

[73] Assignee: The United States of America as represented by the Secretary of the Navy, Washington, D.C.

[22] Filed: Jan. 12, 1972

[21] Appl. No.: 217,406

[52] U.S. Cl. .................................. 340/6 R
[51] Int. Cl.² ............................... G01S 3/80
[58] Field of Search ........ 340/6 R, 16 R; 343/16 M, 343/113 R

[56] References Cited
UNITED STATES PATENTS 3,064,253  11/1962  Kirkpatrick .................... 343/16 M
3,286,224  11/1966  Zefting .......................... 340/6 R Primary Examiner—Richard A. Farley
Attorney, Agent, or Firm—R. S. Sciascia; Henry Hansen

[57] ABSTRACT

A system for measuring the angular displacement of a signal source relative to the center line of an array type transducer. The sum and difference signals of the array are applied to the system which phase shifts the incoming signals, provides a summation of selected phase shifted signals and applies the summed signals to a phase detector. A normalized signal is derived that is an amplitude measurement indicative of the angle between the signal source, and a line incident normal to the array, wherein the sum is a maximum and the difference is zero.

8 Claims, 10 Drawing Figures

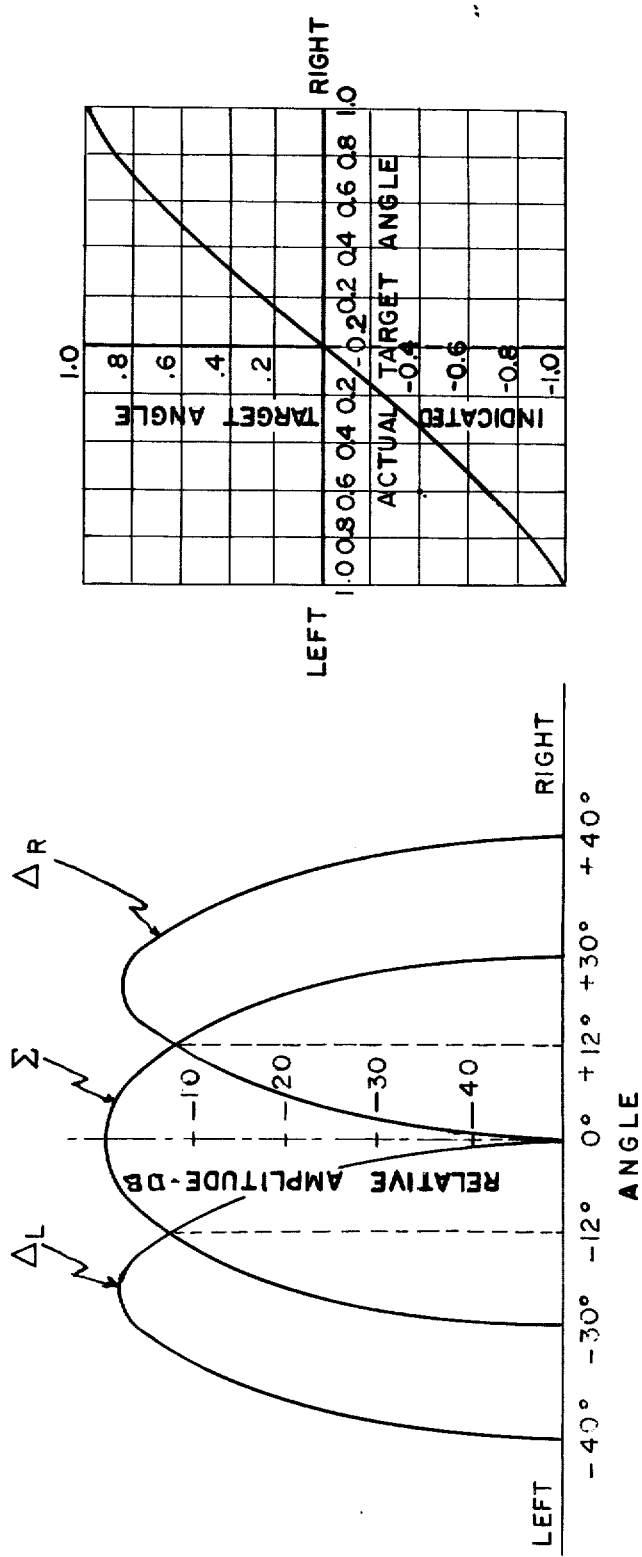

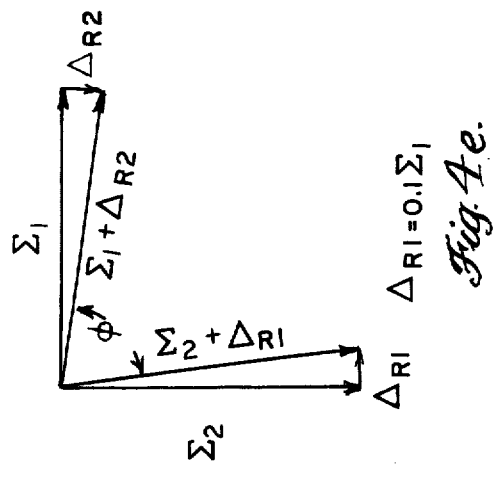
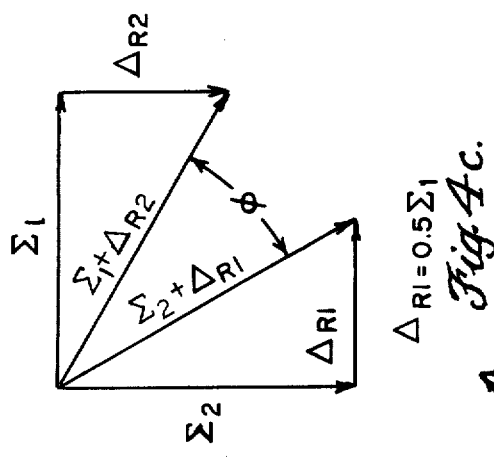
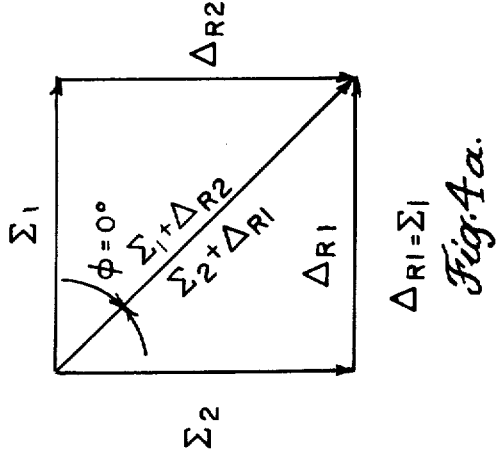
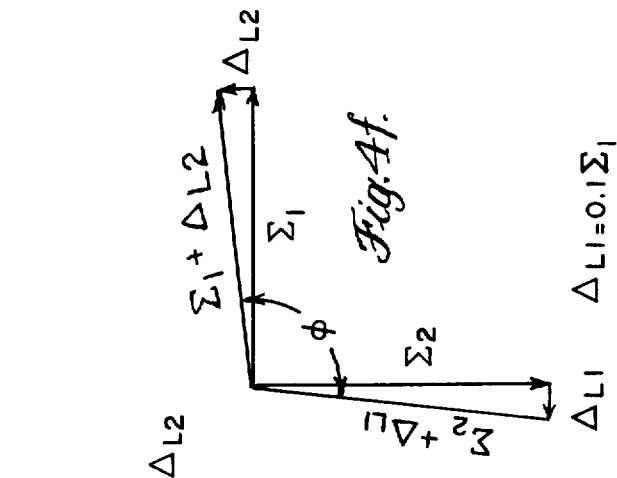
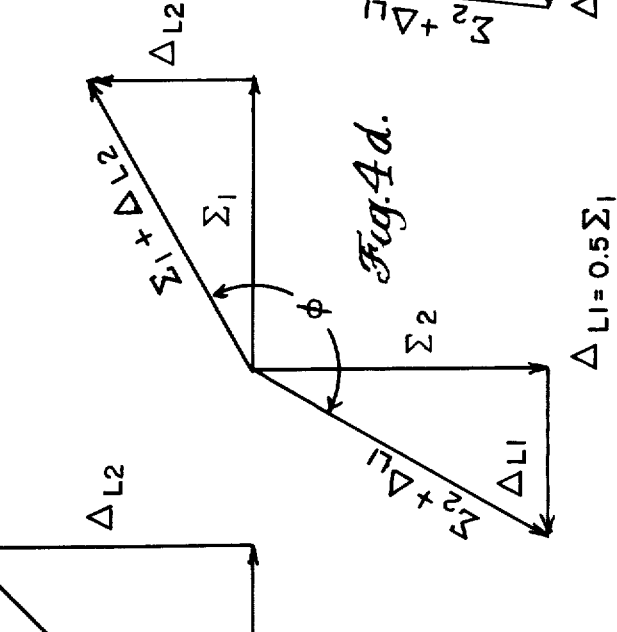
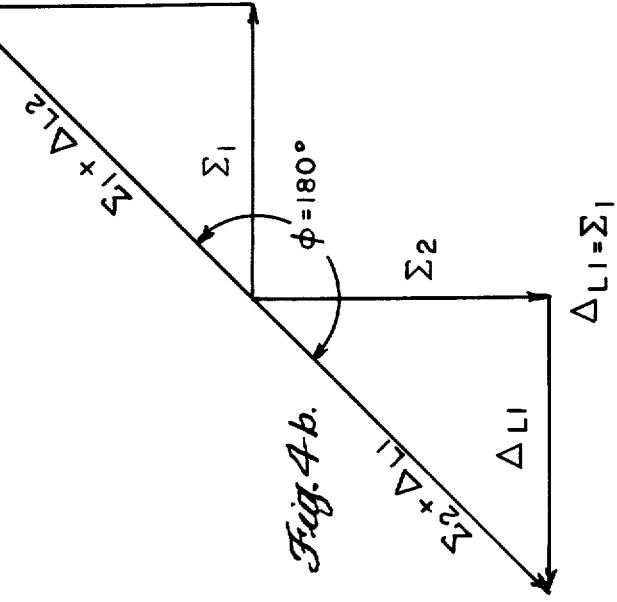

ARRAY TRANSDUCER ANGULAR TRACKING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to a system for processing information signals and more particularly to an angular tracking system for determining the direction of a noise signal.

Acoustics find applications in underwater use. This is because of the superiority of sound wave transmission through this medium to that of electromagnetic waves via radio, radar or light radiation. Among the principle uses of underwater sonic and subsonic waves is that in the area of detection.

Underwater sound detection systems for determining the direction of emitted sonic and subsonic systems are often a compromise in which a transducer array is formed that is suitable for a particular detection system. Such systems are often unduly limited in the number of transducers that can be utilized and many such systems are suitable for only line arrays of transducers. Systems suitable for larger planar arrays are generally unduly complicated and require feedback techniques utilizing complex hardware.

SUMMARY OF THE INVENTION

Accordingly, it is a general purpose of the present invention to provide a system for accurately determining the direction from which a sound emanates utilizing previously developed transducer arrays designed for optimum directional sensitivity.

This is accomplished according to the present invention by a device that measures the angular displacement of a signal source relative to the center line of an array type transducer in which the sum and difference signals of the transducer that are received in quadrature phase relationship are applied to separate input terminals. The sum signal is processed through a lead circuit of $\pi/4$ radians and the difference signal is processed through a lag circuit of $-\pi/4$ radians. This makes the sum and difference signals either in phase or 180° out of phase depending on the direction of the signal relative to the center line of the array. The sum signal is added to the difference signal that has been phase shifted an additional $\pi/2$ radians to form a first signal and the difference signal is added to the sum signal that has also been phase shifted an additional $\pi/2$ radians to form a second signal. The first and second signals are then phase detected for forming an output signal of an amplitude that is a measure of the direction of the received signal.

BRIEF DESCRIPTION OF THE DRAWING

FIG. 2 is the sum and difference patterns of the array transducer of FIG. 1;

FIGS. 3 and 4 are phase diagrams at selected points of the system of FIG. 1; and FIG. 5 shows the indicated angle — actual angle of the detected signal produced by the system of FIG. 1.

DESCRIPTION OF THE PREFERRED EMBODIMENT

Figure 1:
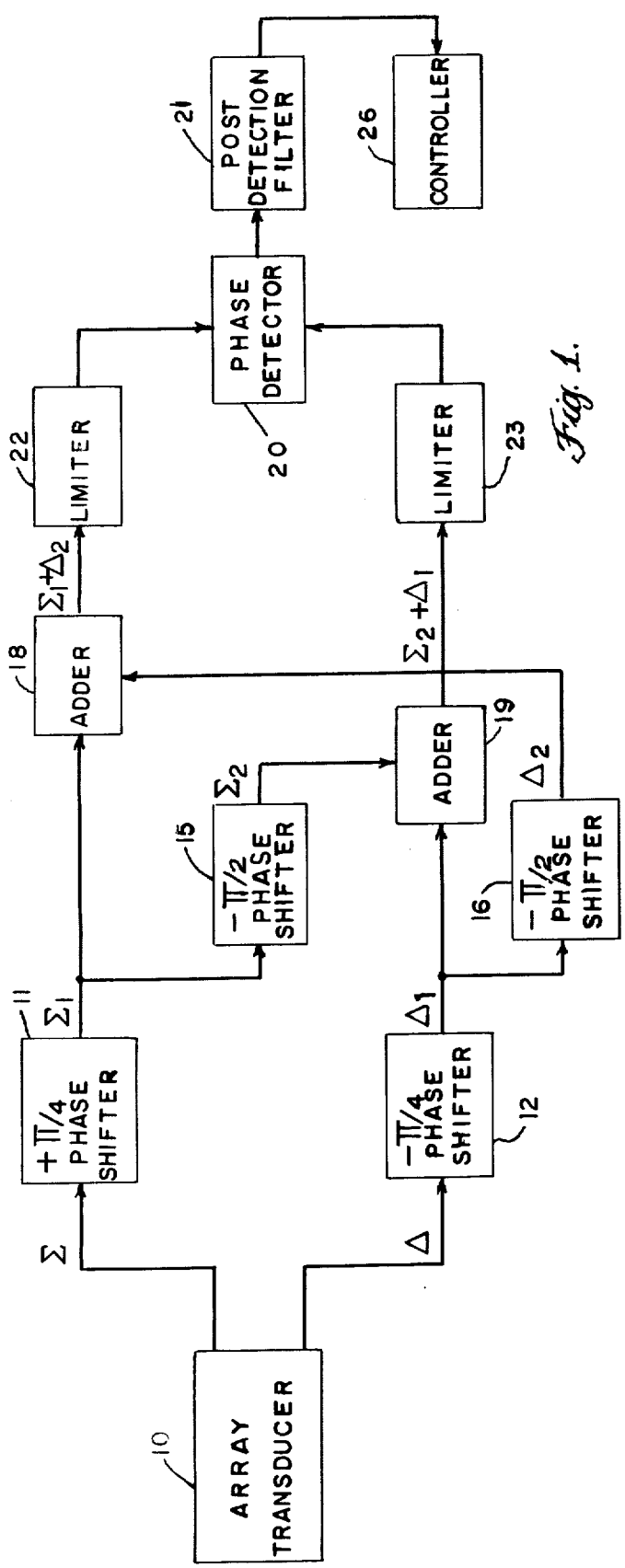
FIG. 1 is a block-schematic diagram of a system for measuring the angular displacement of a signal source relative to the center line of an array type transducer.

Referring now to FIG. 1, there is shown an array type transducer 10 that supplies a sum signal $\Sigma$ and a difference signal $\Delta$. The components within the transducer itself do not comprise a part of the present invention but could be a transducer such as that shown in U.S. Pat. No. 3,441,904 issued to G. L. Wilson.

The signal $\Sigma$ is applied to a $+\pi/4$ radian phase shifter 11 producing an output signal of $\Sigma_1$. The signal $\Delta$ is applied to a $-\pi/4$ radian phase shifter 12 producing an output signal of $\Delta_1$. The signals $\Sigma_1$ and $\Delta_1$ are applied to respective $-\pi/2$ radian phase shifters 15 and 16 producing the respective signals $\Sigma_2$ and $\Delta_2$. An adder 18 receives the $\Sigma_1$ and $\Delta_2$ signals supplying an output signal of $\Sigma_1 + \Delta_2$ and an adder 19 receives the signals $\Sigma_2$ and $\Delta_1$ supplying an output signal of $\Sigma_2 + \Delta_1$. For reasons to be explained later, the output signals of adders 18 and 19 are of a phased relationship indicative of the angle of the signal received by array transducer 10. The output signals of adders 18 and 19 are supplied to phase detector 20 through respective limiters 22 and 23. The detector 20 in effect multiplies the respective signals applied to it and supplies an output signal indicative of this phase relationship. For signals in phase the output is a maximum and for those in quadrature the output is zero. The output of phase detector 20 is applied to post detection filter 21 which is a low pass filter. The output of post detection filter 21 is then supplied to a controller 22. It is to be realized that in addition to a controller 22, the output of the filter 21 could be supplied to an indicator or to any circuit utilizing a signal indicative of the detected angle.

FIG. 2 shows the amplitude characteristics of the sum and difference patterns of array transducer 10. It is to be noted that the particular angles and amplitudes may change depending on the transducer used. As shown the sum reaches a maximum and the difference zero at a center line incident normal to the array. The difference signal utilized may be either the azimuth or vertical depending on the angle being measured. At approximately 12° to either the left or right of the center line a crossover point occurs at which both the sum and difference signals are substantially linear between these crossover points. The magnitude of the steering error can therefore be derived as a function of $\Delta/\Sigma$ between the crossover points and this fraction has a value of less than one.

Figure 3:
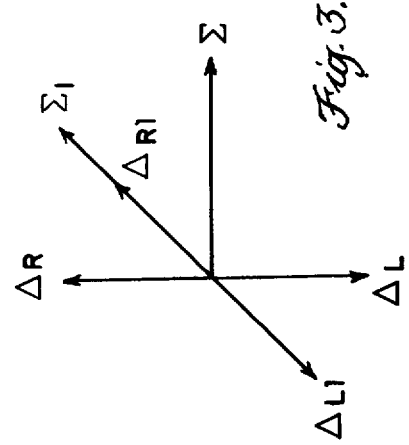

FIG. 3 shows the phase characteristics of the array type transducer 10. Signals impinging on the transducer from the right produce a difference voltage $\Delta_R$ that leads the sum voltage $\Sigma$ by 90°. Signals that impinge on the left of the transducer array 10 produce a different voltage $\Delta_L$ that lags the sum voltage $\Sigma$ by 90°. $\Sigma_1$ shows the summation signal after passing through phase shifter 11. $\Delta_{R1}$ and $\Delta_{L1}$ show the phase relationship of the difference signal depending on its direction relative to the center line after passing through phase shifter 12. It is to be noted that if the signal applied to the transducer 10 is to the right of the center line, the sum and difference signals are in phase at this time and if the signal impinges from the left the sum and difference signals are 180° out of phase at this time.

FIG. 4 shows the relationship of a plurality of received signals from both the left and right of center of the transducer array. FIG. 4a and 4b are at the respective crossover points depending on whether the signal is from the left or the right. FIGS. 4c through 4f are at different points between these crossover points. In addition it is to be noted that a signal incident to the center line of the array would only have the $\Sigma_1$ and $\Sigma$ components and the angle $\phi$ would be 90°.

FIG. 5 shows the indicated target angle versus the actual target angle for the output of phase detector 22.

The operation of the device will now be explained with reference to the FIGS. Suppose a signal is received by array type transducer 10 from an angle coincident to the crossover point to the right. This would make $\Sigma$ and $\Delta_R$ equal in magnitude but in phase quadrature with $\Delta_R$ the leading angle. After passing through respective phase shifters 11 and 12 $\Sigma_1$ and $\Delta_{R1}$ would be equal in both magnitude and phase angle. After being operated on by respective phase shifters 15 and 16 the respective magnitudes and angles of $\Sigma_1$, $\Sigma_2$, $\Delta_{R1}$ and $\Delta_{R2}$ are shown in FIG. 4a. After passing through adders 18 and 19 respectively $\Sigma_1 + \Delta_{R2}$ and $\Sigma_2 + \Delta_{R1}$ are equal in both magnitude and direction. Phase detector 20 upon sensing both signals in the same direction has a maximum amplitude output. This output is sent to post detection filter 21 before being applied to controller 26 or any other utilization network. The normalized output of phase detector 20 can be written as $$A = \frac{2\tan^{-1} \Delta_{R1}/\Sigma_1}{\pi/2}$$

for infinite signal-to-noise ratio and $\Sigma > \Delta$, also, $$A = \frac{-2\tan^{-1} \Delta_L/\Sigma_1}{\pi/2}$$

for the same conditions. This can readily be seen by noting that the amplitude of the output of phase detector 20 is a function of the complement of the angle $\phi$ in FIGS. 4a, 4c and 4e.

It has therefore been shown a system for measuring the angular displacement of a signal source relative to the center line of an array type transducer. The system by appropriate phase shifting of the sum and difference signals that are received in quadrature from an array transducer 10 provides a means by which a phase sensitive detector 26 can supply an output signal indicative of the angle of incidence to the array.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A signal processing system for determining the directional information in a plurality of signals comprising:

first and second means for receiving a first and second signal in phase quadrature to each other and phase shifting the first signal 90° with respect to the second signal;

third means connected to receive said first means output for phase shifting said first signal −90°;

fourth means connected to said second means for phase shifting said second signal −90°;

a first adder connected to receive the output signals of said first means and said fourth means for adding the first and fourth means output signals and providing an output signal indicative of the sum;

a second adder connected to receive the output signals of said second means and said third means for adding the second and said third means output signals and providing an output signal indicative of the sum; and a phase sensitive detector connected to receive the output signals of said first and second adder for providing an output signal indicative of the directional information within said first and second signals.

2. A signal processing system according to claim 1 further comprising:

a first limiter connected intermediate said first adder and said phase sensitive detector; and a second limiter connected intermediate said second adder and said phase sensitive detector.

3. A signal processing system according to claim 2 further comprising:

said first means upon receipt of said first signal phase shifting said first signal +45°; and said second means upon receipt of said second signal phase shifting said second signal −45°.

4. A signal processing system according to claim 3 further comprising:

a post detection filter connected to said phase sensitive detector for eliminating spurious high frequency signals.

5. An array transducer angular tracking system comprising:

an array transducer providing sum and difference signals;

first and second means for receiving said sum and difference signals in quadrature to each other and phase shifting said sum signal 90° with respect to said difference signal;

third means connected to receive the first means output for phase shifting said sum signal −90°;

fourth means connected to the second means output for phase shifting said difference signal −90°;

a first adder connected to receive the output signals of said first means and said fourth means for adding the first and fourth means output signals and providing an output signal indicative of the sum;

a second adder connected to receive the output signals of said second means and said third means for adding the second and third means output signals and providing an output signal indicative of the sum; and a phase sensitive detector connected to receive the output signals of said first and second adder for providing an output signal indicative of the directional information within said sum and difference signals.

6. An array transducer angular tracking system according to claim 5 further comprising:

a first limiter connected intermediate said first adder and said phase sensitive detector; and a second limiter connected intermediate said second adder and said phase sensitive detector.

7. An array transducer angular tracking system according to claim 6 further comprising:

said first means upon receipt of said sum signal phase shifting said sum signal +45°; and said second means upon receipt of said difference signal phase shifting said difference signal −45°.

8. An array transducer angular tracking system according to claim 7 further comprising:

a post-detection filter connected to said phase sensitive detector for eliminating spurious high frequency signals.

* * * * *